Patented Jan. 19, 1954

2,666,782

UNITED STATES PATENT OFFICE 2,666,782

METHOD FOR PREPARING ALKYL ESTERS OF ACRYLIC ACIDS

Charles E. Brockway, Akron, Ohio, assignor to The B. F. Goodrich Company, New York, N. Y., a corporation of New York No Drawing. Application August 11, 1950, Serial No. 178,997

5 Claims. (Cl. 260—486)

This invention relates to the preparation of alkyl esters of acrylic acid, and pertains more particularly to the preparation of such esters by the reaction of an alkanol, acrylonitrile and a strong mineral oxyacid.

It is known that esters may be obtained by reacting nitriles with water and an alcohol in the presence of a strong mineral acid. For example, Spiegel (Berichte 51, 297, 1918) prepared methyl acrylate by adding sulfuric acid to a solution of acrylonitrile and methanol. In U. S. Patent 1,829,208 to Bauer, a similar reaction, substituting ethylene cyanohydrin for the acrylonitrile, is disclosed. However, these and other similar reactions are not well suited for use on a commercial scale because the yields of acrylic acid esters obtained are relatively low and because an extremely long reaction time is necessary before the desired product is obtained.

Accordingly, it is an object of the present invention to provide an economical method for preparing alkyl esters of acrylic acid in high yields. Another object is to prepare such esters by a method requiring only a very short reaction time. Other objects will be apparent hereinafter.

I have now discovered that these and other objects are readily attained by a two-step process wherein a reaction product of acrylonitrile and a strong mineral oxyacid is first prepared and as the second step an alkanol, either alone or together with a quantity of water is reacted with said acrylonitrile-acid reaction product to form alkyl acrylate. In the preferred mode of operation the alkyl acrylate is continuously vaporized as it forms and the vapors condensed to yield the liquid acrylate. In this manner very high yields of alkyl esters of acrylic acid are obtained and in addition the reaction time is only about one-eighth that of the methods heretofore utilized to prepare such esters. Also, by utilizing the relatively simple process of this invention, the preparation of alkyl esters of acrylic acid by the difficult direct esterification of acrylic acid is avoided.

The overall reaction of the invention may be depicted by the following equation:

(Sulphuric acid being shown as the mineral acid)

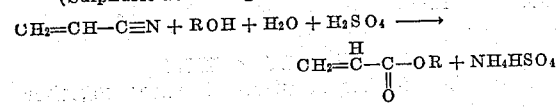

wherein R is an alkyl radical, preferably containing from 1 to 8 carbon atoms. In addition to the products shown in the equation, a small amount of a dialkyl ether is also obtained.

The exact nature of the acrylonitrile-acid reaction product is not definitely known. However, possible reactions which might occur, either separately or simultaneously are salt formation, addition of the acid at the nitrile triple bond or addition of the acid at the carbon to carbon double bond.

In preparing the nitrile-acid intermediate the acrylonitrile is preferably added to the acid, since addition of the acid to the nitrile is likely to produce a highly exothermic reaction which may become uncontrollable if extreme care is not exercised. The addition of the acrylonitrile also tends to cause an exothermic reaction to take place; however, by regulating the speed of addition of the acrylonitrile, the temperature of the mixture can be conveniently controlled to any desired temperature. It is preferable that an excess of the acid be utilized; for example, from about 1.5 to 10 moles of acid for each mole of acrylonitrile, with an especially preferred ratio being from 1.75 to 2.5 moles of acid for each mole of acrylonitrile.

It is also desirable that the intermediate product thus formed contain a polymerization inhibitor to prevent the formation of a gel. Suitable inhibitors include hydroquinnone, phenyl-beta-naphthylamine, tertiary butyl catechol, picric acid and the like. The intermediate product should be utilized in the preparation of acrylates as soon as is conveniently possible after formation although, if desired, it may be stored for relatively short periods of time with but small decrease in the yield of acrylate when the intermediate is used.

Any strong mineral oxyacid such as sulfuric acid, phosphoric acid, and the like may be employed in the preparation of the intermediate product, sulfuric acid being especially preferred since highest yields of acrylates are thereby secured. The acid is preferably utilized in a concentration of 50 to 95%, and especially in a concentration of 75 to 90%.

The second step of the process consists in reacting an alkanol with the intermediate product prepared in the manner described hereinabove. Among the alkanols which may be utilized are included methanol, ethanol, propanol, butanol, pentanol, hexanol, heptanol, octanol, decanol, isopropanol, dodecanol, 3,5,5-trimethyl hexanol, pentadecanol and the like, with those alkanols which contain from 1 to 8 carbon atoms being especially preferred. The alcohol may be present in any desired quantity; however, in general it may be stated that best results are obtained when from 1 to 10 moles of the alkanol are used for each mole of acrylonitrile in the intermediate product, and particularly when from 3 to 5 moles of alkanol are utilized for each mole of acrylonitrile present.

A preferred mode of operation in the second step consists in adding the alkanol to the nitrile-acid intermediate while the latter is maintained at a temperature of about 100 to 250° C., especially from 135 to 165° C. At this temperature the acrylate (as well as a dialkyl ether) formed by the reaction is generally vaporized and removed from the reaction zone in the form of vapors which are then condensed to give the liquid acrylate. For example, the nitrile-acid intermediate may be placed in a suitable reactor equipped with an agitator, a condenser and condensate receiver, and the alkanol then slowly added while the reaction mixture is agitated to assure efficient contact of the reactants. The desired acrylate is collected in the receiver together with some unreacted alkanol, water and small quantities of acrylic acid. It is desirable that an inhibitor be present in the receiver to prevent substantial polymerization of the monomeric acrylate as it is collected. The acrylate is readily obtained in very pure form by a simple extractive distillation utilizing water as the extractive agent, or by any other conventional means of separation.

It has been found that the addition of water together with the alkanol results in increased yields of acrylic acid esters and in decreased yields of the dialkyl ether. The quantity of water added is not critical but the optimum beneficial effect from the water is secured when from 0.5 to 4 moles of water are added for each mole of the alkanol.

It has been further found that a portion of the dialkyl ether formed during the process may be recycled into the reactor in order to replace part of the alkanol and thus reduce the consumption of the alkanol. The ether may be added to either the intermediate product before the addition of the alkanol, or may be added to the intermediate product together with the alkanol.

Because of the corrosive nature of the nitrile-acid intermediate product it is preferred that the process of this invention be carried out in a reactor made from a material which is substantially non-corrosive. Among the materials which are particularly satisfactory are included glass, ceramics, metals coated with certain enamels, carbon, resin bonded carbons, polytetrafluoro ethylenes, and the like.

The following examples are intended to illustrate more fully the preparation of alkyl acrylates according to the method of this invention, but are not to be construed as a limitation upon the scope thereof, for there are, of course, numerous possible variations and modifications.

Example I

A reaction product of acrylonitrile and sulfuric acid is prepared by adding 25 parts of water to 200 parts of 95.5% sulfuric acid (2 moles) containing 2 parts of hydroquinone (this addition raising the temperature of the mixture to about 100° C.) and then adding 53 parts of acrylonitrile (1 mole) with stirring. The resulting solution is then transferred to a glass reactor connected to a condenser and receiver and heated to about 150° C. A mixture of 65 parts (2 moles) of methanol and 18 parts (1 mole) of water is added to the acrylonitrile-sulfuric acid intermediate product with stirring over a one hour period. The receiver is then heated to about 40° C. to expel the methyl ether. The remaining material in the receiver analyzes 68.5% methyl acrylate, giving a yield of 79 parts (92%) of methyl acrylate.

Examples II to VII

In each of the following examples an acrylonitrile-sulfuric acid reaction product is prepared by adding 1 mole of acrylonitrile to 2 moles of sulfuric acid of various concentrations. To this mixture contained in the apparatus of Example I, 2 moles of methanol are added over a period of an hour, the reaction mixture being constantly agitated during the methanol addition. The receiver is warmed to expel methyl ether and the methyl acrylate recovered by extractive distillation using water as the extracting agent. The reaction temperature, acid concentration and per cent of theoretical yield of the methyl acrylate are tabulated below:

TABLE I

| Example | Acid concentration (percent) | Temperature, °C. | Percent yield acrylate |
| --- | --- | --- | --- |
| II | 85 | 150 | 80 |
| III | 85 | 150 | 82 |
| IV | 75 | 150 | 62 |
| V | 75 | 150 | 59 |
| VI | 70 | 150 | 54 |
| VII | 65 | 150 | 45 |

Examples VIII to XIX

In each of the following examples 5 moles of acrylonitrile are slowly added to 10 moles of constantly agitated 85% sulfuric acid containing hydroquinone as an inhibitor. This mixture, contained in the apparatus of Example I, is then heated and methanol added, whereupon reaction occurs to form methyl acrylate which collects in the receiver. In Examples XVI, XVII, XVIII, and XIX, a quantity of methyl ether is recycled to replace a portion of the methanol. The methyl acrylate is recovered by extractive distillation utilizing water as the extracting agent. The quantity of methanol and methyl ether added, reaction temperature, time required to add the methanol, per cent of methyl acrylate in the crude reaction product and the per cent of theoretical yield of methyl acrylate are recorded below:

TABLE II

| Example | Moles methanol added | Methyl ether added | Reaction temperature, °C. | Time to add methanol (min.) | Percent methyl acrylate in the crude reaction mixture | Percent theoretical yield of methyl acrylate |
| --- | --- | --- | --- | --- | --- | --- |
| VIII | 15.0 | 0 | 145 | 60 | 79.8 | 84.0 |
| IX | 11.25 | 0 | 155 | 75 | 79.1 | 88.2 |
| X | 7.5 | 0 | 150 | 51 | 78.0 | 63.7 |
| XI | 15.0 | 0 | 152 | 83 | 71.1 | 87.0 |
| XII | 10.0 | 0 | 152 | 63 | 79.8 | 80.1 |
| XIII | 15.0 | 0 | 153 | 95 | 78.4 | 86.3 |
| XIV | 11.25 | 0 | 153 | 78 | 81.0 | 70.4 |
| XV | 11.25 | 0 | 150 | 68 | 79.1 | 80.4 |
| XVI | 10.0 | 2.5 | 150 | 63 | 79.8 | 80.4 |
| XVII | 7.5 | 1.67 | 153 | 47 | 80.3 | 77.2 |
| XVIII | 10.0 | 1.48 | 150 | 65 | 79.2 | 86.5 |
| XIX | 13.5 | 1.46 | 149 | 59 | 72.1 | 86.8 |

Examples XX to XXII

The effect of the addition of water together with the alkanol is shown in the following examples wherein 10.6 parts of acrylonitrile are added to various quantities of 85% sulfuric acid containing phenyl-beta-naphthylamine, to form an intermediate product. To this intermediate methanol and water are added and methyl acrylate recovered from the crude reaction product by the method of Examples I to IX. The pertinent data is recorded in Table III below:

TABLE III

| Example | Parts methanol added | Parts sulfuric acid | Parts water added | Reaction temperature °C. | Time to add methanol and water (min.) | Percent methyl acrylate in crude reaction mixture | Percent theoretical yield of methyl acrylate |
|---|---|---|---|---|---|---|---|
| XX | 19.2 | 39.2 | 0.0 | 148 | 57 | 61.0 | 81.3 |
| XXI | 19.2 | 39.2 | 3.6 | 147 | 61 | 61.0 | 86.6 |
| XXII | 19.2 | 39.2 | 7.2 | 147 | 62 | 53.8 | 88.2 |

Example XXIII

A reaction product is prepared by adding 53 parts (1 mole) of acrylonitrile to 2 moles of 85% sulfuric acid containing 2 parts of hydroquinone. The resulting reaction product is then heated to about 150° C. and 138 parts (3 moles) of ethanol and 18 parts (1 mole) of water are added. Heating is continued for 1 hour and the effluent vapors are condensed and collected in a receiver. The receiver is then warmed to about 40° C. to expel the diethyl ether and the ethyl acrylate is recovered by extractive distillation. An 89% yield of ethyl acrylate is thus obtained.

Example XXIV

Example XXIII is repeated except that no water is added to the intermediate product. The yield of ethyl acrylate obtained is 83%.

Although the previous examples are carried out on a batch basis, the process of this invention is also well suited for use as a continuous process. For example, when 6.5 moles of methanol are added to a mixture of 4 moles of 85% sulfuric acid and 2 moles of acrylonitrile, the process being carried out on a continuous basis, a total yield of 87.4% of substantially pure methyl acrylate is obtained.

Moreover, when other mineral oxyacids are substituted for sulfuric acid in the above examples, or when other alkanols are substituted for methanol and ethanol, good yields of alkyl acrylates are obtained.

The alkyl acrylates obtained by the process of this invention are very useful chemical compounds. For example, all of the alkyl acrylates are used in large quantities as polymerizable materials in the production of synthetic rubbers, synthetic resins and the like. The alkyl acrylates are also useful as intermediates in the synthesis of other chemical compounds as well as for many other uses.

Although specific examples of the invention have been herein described, it is not intended to limit the invention solely thereto, but to include all of the variations and modifications falling within the spirit and scope of the appended claims.

I claim:

1. The method of preparing an alkyl acrylate in which the alkyl radical contains from 1 to 8 carbon atoms, which comprises first preparing an intermediate reaction product in the presence of a polymerization inhibitor by admixing acrylonitrile with a mineral oxyacid having a concentration of at least 85% said oxyacid being present in such quantities that the mixture contains from 1.5 to 10 moles of oxyacid for each mole of acrylonitrile, heating said intermediate reaction product to a temperature of 100° C. to 250° C., and then slowly and continuously adding to said intermediate reaction product over a substantial time interval not greater than about an hour from 3 to 5 moles of a $C_1$ to $C_8$ alkanol per mole of acrylonitrile and from 0.5 to 4.0 moles of water per mole of said alkanol, and continuously evaporating, condensing and collecting the alkyl acrylate as the latter forms during the alkanol addition.

2. The method of preparing an alkyl acrylate in which the alkyl radical contains from 1 to 8 carbon atoms, which comprises first preparing an intermediate reaction product, in the presence of a polymerization inhibitor, by admixing acrylonitrile with a mineral oxyacid having a concentration of at least 85% said oxyacid being present in such quantities that the mixture contains from 1.5 to 10 moles of oxyacid for each mole of acrylonitrile, heating said intermediate reaction product to a temperature of 135° C. to 165° C., and then slowly and continuously adding to said intermediate reaction product from 3 to 5 moles of a $C_1$ to $C_8$ alkanol per mole of acrylonitrile and from 0.5 to 4.0 moles of water per mole of said alkanol, and continuously evaporating, condensing and collecting the alkyl acrylate as the latter forms during the alkanol addition.

3. The method of claim 2 wherein the mineral oxyacid is sulfuric acid.

4. The method of claim 3 wherein the alkanol is methanol, the alkyl acrylate collected being methyl acrylate.

5. The method of claim 3 wherein the alkanol is ethanol, the alkyl acrylate collected being ethyl acrylate.

CHARLES E. BROCKWAY.

References Cited in the file of this patent

UNITED STATES PATENTS

| Number | Name | Date |
|---|---|---|
| 2,526,310 | Wiley et al. | Oct. 17, 1950 |